United States Patent
Sone et al.

(10) Patent No.: US 6,747,085 B2
(45) Date of Patent: Jun. 8, 2004

(54) CONJUGATED DIENE POLYMER AND RUBBER COMPOSITION

(75) Inventors: Takuo Sone, Tokyo (JP); Daisuke Yamazaki, Toyko (JP); Katsutoshi Nonaka, Toyko (JP); Iwakazu Hattori, Toyko (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 10/253,933

(22) Filed: Sep. 25, 2002

(65) Prior Publication Data

US 2003/0065083 A1 Apr. 3, 2003

Related U.S. Application Data

(63) Continuation of application No. 09/709,562, filed on Nov. 13, 2000, now abandoned.

(30) Foreign Application Priority Data

Nov. 12, 1999 (JP) ............................................. 11-322369

(51) Int. Cl.$^7$ .............................. C08K 3/36; C08L 9/00; C08F 4/12; C08F 4/54
(52) U.S. Cl. ....................... 524/493; 524/269; 524/571; 526/104; 526/273
(58) Field of Search ................................. 524/269, 493, 524/571; 526/164, 273

(56) References Cited

U.S. PATENT DOCUMENTS

| | | | |
|---|---|---|---|
| 5,064,910 A | 11/1991 | Hattori et al. | |
| 5,569,699 A | 10/1996 | Ferrandino et al. | |
| 6,022,922 A | 2/2000 | Bergh et al. | |
| 6,255,416 B1 | 7/2001 | Sone et al. | |

FOREIGN PATENT DOCUMENTS

| EP | 0863165 | 9/1998 |
|---|---|---|
| EP | 1 092 735 A1 | 4/2001 |
| JP | 37-8198 | 7/1962 |
| JP | 47-14729 | 5/1972 |
| JP | 62-1404 | 1/1987 |
| JP | 63-64444 | 12/1988 |
| JP | 1-16244 | 3/1989 |
| JP | 4-2601 | 1/1992 |
| JP | 6-211916 | 8/1994 |
| JP | 6-306113 | 11/1994 |
| JP | 8-73515 | 3/1996 |
| JP | 10-35633 | 2/1998 |
| JP | 10-306113 | 11/1998 |

OTHER PUBLICATIONS

Iwakazu Hattori et al., "Chemical Modification of Neodymium High cis–1,4 Polybutadiene with Styreneoxide" Polymers for Advance Technologies, GB, John Wiley and Sons, Chichester, vol. 4, No. 7, Aug. 1, 1993, pp. 450–456.

Young H. Kim et al.; "Hydroxylation of Polysoprene via Addition of Haloacetic Acids to the Double Bond" Macromolecules, US, Amercian Chemical Society, Easton, vol. 24,; Nov. 25, 1991 pp. 6505–6511.

C.S. Marvel et al.; "Polybutadiene Modified by Addition of Thiols Containing Polar Groups" Industrial and Engineering Chemistry, American Chemical Society, US, vol. 45, No. 9 1953 pp. 2090–2093.

*Primary Examiner*—Tae H. Yoon
(74) *Attorney, Agent, or Firm*—Sughrue Mion, PLLC

(57) ABSTRACT

A conjugated diene polymer is produced by continuously polymerizing a conjugated diene monomer with a catalyst consisting essentially of specified components (a) to (c) and reacting with at least one of specified components (d) and (e) and has a content of cis-1,4-bond of not less than 85%, a content of 1,2-vinyl bond of not more than 2.0% and a ratio of weight average molecular weight (Mw) to number average molecular weight (Mn) of not more than 5, and contains at least one functional group selected from epoxy group and hydroxyl group in its molecule. And also, a rubber composition comprises 10–200 parts by weight of silica based on 100 parts by weight of rubber ingredient consisting of 10–100% by weight of the above conjugated diene polymer and 90–0% by weight of the other diene polymer or natural rubber.

10 Claims, No Drawings

CONJUGATED DIENE POLYMER AND RUBBER COMPOSITION

This is a continuation of application Ser. No. 09/709,562 filed Nov. 13, 2000, now abandand the disclosure of which is incorporated herein by reference.

BACKGROUND OF THE INVENTION

1. Field of the Invention

This invention relates to a conjugated diene polymer and a rubber composition obtained by compounding this polymer with silica, and more particularly to a conjugated diene polymer capable of providing a rubber composition having excellent properties such as wear resistance, mechanical properties, low heat build-up and the like by polymerizing a conjugated diene compound(s) with a novel rare earth element containing compound as a catalyst and then reacting the resulting polymer just after the polymerization with a compound having a particular functional group (a modifying agent) so as to interact with silica to improve a dispersibility of silica as well as a rubber composition obtained by compounding this polymer with silica.

2. Description of Related Art

As a polymerization catalyst for conjugated diene compounds, there have hitherto been proposed many catalysts, which play an important role in industry. Particularly, many polymerization catalysts giving a high content of cis-1,4-bond have been studied and developed for the purpose of providing conjugated diene polymers having excellent mechanical and thermal properties. For example, there is well-known a composite catalyst system containing a compound of a transition metal such as nickel, cobalt, titanium or the like as an essential component. Among them, some catalysts have industrially and widely been used as a polymerization catalyst of butadiene, isoprene or the like (see End. Ing. Chem., 48, 784(1956) and JP-B-37-8198).

On the other hand, in order to give a higher content of cis-1,4-bond and an excellent polymerization activity, there has been studied and developed a high stereospecific polymerization using a composite catalyst system comprising a rare earth metal compound and an organometal compound of an element of Group I–III.

In JP-B-47-14729 is disclosed a catalyst system comprising a rare earth metal compound such as cerium octanoate or the like and an alkyl aluminum hydride such as diisobutyl aluminum hydride or an aluminum hydride such as trialkyl aluminum, ethyl aluminum dichloride or the like. Especially, this publication discloses that a catalytic activity is increased by aging the catalyst system in the presence of butadiene.

And also, JP-B-62-1404, JP-B-63-64444 and JP-B-1-16244 propose a method wherein the catalytic activity is increased by enhancing a solubility of a compound of a rare earth element in a polymerization solvent. Further, JP-B-4-2601 discloses that a catalyst system comprising a rare earth metal compound, trialkyl aluminum or aluminum hydride and an organic halogen derivative indicates an activity higher than that of the conventional one in the polymerization of 1,3-butadiene.

However, the polymers obtained through the conventional catalyst system containing the rare earth metal compound becomes wider in the molecular weight distribution and do not sufficiently improve the wear resistance and rebound resilience.

Furthermore, JP-A-6-211916, JP-A-6-306113 and JP-A-8-73515 report that when a catalyst system using a neodymium compound and methyl aluminoxane indicates a high polymerization activity and provides a conjugated diene polymer having a narrow molecular weight distribution.

However, in order to provide polymers having the narrow molecular weight distribution while maintaining a sufficient catalytic activity in the above polymerization method, it is required to use a greater amount of aluminoxane as compared with the conventional catalyst using an organoaluminum compound. Such an aluminoxane is expensive in the cost as compared with the usual organoaluminum compound and large in the cold flow and has problems in the storage stability and the like, so that there is a problem in practical use.

In order to solve these problems, JP-A-10-306113 and JP-A-10-35633 report that the conjugated diene polymer polymerized through a catalyst system using methyl aluminoxane is modified with a hetero three-membered ring compound, a halogenated metal compound, a metal carbonate or the like to suppress the cold flow.

Recently, resource-saving, environmental measure and the like are regarded as important and hence a demand for reducing fuel consumption of an automobile becomes more severer and also it is demanded to reduce the rolling resistance even in the tire for automobile in order to contribute the tire to the low fuel consumption. For the purpose of reducing the rolling resistance of the tire, a rubber material capable of providing a cured rubber having a low heat build-up is generally used as a rubber material for the tire.

However, when the aforementioned conjugated diene polymer is used to prepare a rubber composition with silica, the interaction between such a polymer (rubber) and silica is not sufficient and hence the dispersibility of silica into the resulting rubber composition is poor and also the properties of the resulting cured rubber such as wear resistance, mechanical properties, low heat build-up and the like do not arrive in a satisfactory level.

DESCRIPTION OF THE INVENTION

The inventors have made various studies and found that conjugated diene polymers having a high content of 1,4-cis bond, a low content of 1,2-vinyl bond and a narrow molecular weight distribution, and containing a specified functional group in their molecule are excellent in the interaction with silica and a vulcanizate of the resulting rubber composition has excellent properties such as wear resistance, mechanical properties, low heat build-up and the like, and as a result the invention has been accomplished.

A first aspect of the invention lies in a conjugated diene polymer having a content of cis-1,4-bond of not less than 85%, a content of 1,2-vinyl bond of not more than 2.0% and a ratio of weight average molecular weight (Mw) to number average molecular weight (Mn) of not more than 5, and containing at least one functional group selected from epoxy group and hydroxyl group in its molecule.

In this case, it is favorable that the conjugated diene polymer is obtained by polymerizing a conjugated diene compound with a catalyst consisting essentially of the following components (a) to (c) and subsequently reacting with at least one compound selected from the group consisting of the following components (d) and (e):

Component (a): a compound containing a rare earth element belonging to atomic numbers 57–71 in Periodic Table, or a reaction product between such a compound and a Lewis base;

Component (b): an aluminoxane and/or an organoaluminum compound having a general formula of $AlR^1R^2R^3$ (wherein $R^1$ and $R^2$ are the same or different and are a hydrogen atom and a hydrocarbon group having a carbon number of 1–10, and $R^3$ is a hydrocarbon group having a carbon number of 1–10, provided that $R^3$ is the same or different from $R^1$ and $R^2$);

Component (c): a halogen-containing compound;

Component (d): a hydroxyl group-containing vinyl compound;

Component (e): an epoxy compound.

The above halogen-containing compound (c) is preferable to be a reaction product between a metal halide and a Lewis base. It is favorable that the metal halide constituting the component (c) is a halide of a metal belonging to Group 1, 2 and/or 7 in Periodic Table, and the Lewis base is a phosphoric ester, a diketone compound, a carboxylic acid and/or an alcohol.

A second aspect of the invention lies in a rubber composition comprising 10–200 parts by weight of silica based on 100 parts by weight of rubber ingredient consisting of 10–100% by weight of the above conjugated diene polymer and 90–0% by weight of the other diene polymer or natural rubber.

The rubber composition is favorable to further contain 1–20 parts by weight of a silane coupling agent based on 100 parts by weight of the rubber ingredient.

DESCRIPTION OF PREFERRED EMBODIMENTS

The conjugated diene polymer according to the invention has a content of cis-1,4-bond of not less than 85%, preferably not less than 90%, a content of 1,2-vinyl bond of not more than 2.0%, preferably not more than 1.5% and a ratio of weight average molecular weight (Mw) to number average molecular weight (Mn) of not more than 5, preferably not more than 4 and contains at least one functional group selected from epoxy group and hydroxyl group in its molecule.

When the content of cis-1,4-bond is less than 85%, the wear resistance is poor. When the content of 1,2-vinyl bond exceeds 2.0%, the durability is poor. When Mw/Mn exceeds 5, the wear resistance is poor.

And also, when the functional group selected from epoxy group and hydroxyl group is not contained in the molecule of the conjugated diene polymer according to the invention, the interaction with silica is insufficient and the dispersibility of silica lowers.

Furthermore, the conjugated diene polymer according to the invention is favorable to have a Moony viscosity at 100° C. ($ML_{1+4}$, 100° C.) of 10–150. When the Moony viscosity is less than 10, the wear resistance after the vulcanization is poor, while when it exceeds 150, the processability in the kneading is poor.

Moreover, the conjugated diene polymer according to the invention is favorable to have a weight average molecular weight as converted by polystyrene of 100,000–1,500,000, preferably 150,000–1,000,000. When it is outside the above range, the processability and the properties of the cured rubber are unfavorably poor.

The conjugated diene polymer according to the invention is obtained by polymerizing a conjugated diene compound with a catalyst consisting of the components (a) to (c) and subsequently reacting with at least one compound selected from the components (d) to (e).

The component (a) used in the catalyst according to the invention is a compound containing a rare earth element belonging to atomic numbers 57–71 in Periodic Table (rare earth element containing compound), or a reaction product between such a compound and a Lewis base. As the rare earth element, neodymium, praseodymium, cerium, lanthanum, gadolinium or the like, or a mixture thereof is favorable, and neodymium is particularly favorable.

As the rare earth element containing compound according to the invention, there are carboxylates, alkoxides, β-diketone complexes, phosphates and phosphites. Among them, the carboxylates and phosphates are favorable, and particularly the carboxylate is favorable.

The carboxylate of the rare earth element is represented by a general formula of $(R^4—CO_2)_3M$, wherein M is a rare earth element belonging to atomic numbers 57–71 in Periodic Table and $R^4$ is a hydrocarbon group having a carbon number of 1–20, preferably a saturated or unsaturated and straight-chain, branched-chain or cyclic hydrocarbon group, to a primary, secondary or tertiary carbon atom of which is bonded a carboxyl group.

Concretely, salts of octanoic acid, 2-ethylhexanoic acid, oleic acid, stearic acid, benzoic acid, naphthenic acid, versatic acid (carboxylic acid wherein carboxyl group is bonded to a tertiary carbon atom, trade name made by Shell Chemical Corporation) and the like are mentioned. Among them, salts of 2-ethylhexanoic acid, naphthenic acid and versatic acid are preferable.

The alkoxide of the rare earth element is represented by a general formula of $(R^5O)_3M$, wherein $R^5$ is a hydrocarbon group having a carbon number of 1–20 and M is a rare earth element belonging to atomic numbers 57–71 in Periodic Table. As an example of a group represented by $R^5O$, there are mentioned 2-ethyl-hexyl alkoxy group, oleyl alkoxy group, stearyl alkoxy group, phenoxy group, benzyl alkoxy group and the like. Among them, 2-ethyl-hexyl alkoxy group and benzyl alkoxy group are favorable.

As the β-diketone complex of the rare earth element, there are mentioned acetylacetone complex, benzoylacetone complex, propionitorileacetone complex, valerylacetone complex, ethylacetylacetone complex and the like of the rare earth element. Among them, acetylacetone complex and ethylacetylacetone complex are favorable.

As the phosphate or phosphite of the rare earth element, there are mentioned bis(2-ethylhexyl) phosphate, bis(1-methylheptyl) phosphate, bis(p-nonylphenyl) phosphate, bis(polyethylene glycol-p-nonylphenyl) phosphate, (1-methylheptyl)(2-ethylhexyl) phosphate, (2-ethylhexyl)(p-nonylphenyl) phosphate, 2-ethylhexyl, mono-2-ethylhexyl phosphonate, 2-ethylhexyl, mono-p-nonylphenyl phosphonate, bis(2-ethylhexyl) phosphite, bis(1-methylheptyl) phosphite, bis(p-nonylphenyl) phosphite, (1-methylheptyl)(2-ethylhexyl) phosphite, (2-ethylhexyl)(p-nonylphenyl) phosphite and the like of the rare earth element. Among them, bis(2-ethylhexyl) phosphate, bis(1-methylheptyl) phosphate, 2-ethylhexyl, mono-2-ethylhexyl phosphite and bis(2-ethylhexyl) phosphite are favorable.

Among the above rare earth element containing compounds, phosphates of neodymium and carboxylates of neodymium are preferable, and carboxylates of neodymium such as neodymium 2-ethyl-hexanoate, neodymium versatate and the like are most preferable.

In order to easily dissolve the rare earth element containing compound in a solvent or stably store over a long time of period, a Lewis base is used in an amount of 0–30 mole, preferably 1–10 mole per 1 mole of the rare earth element as a mixture of both compounds or a reaction product obtained previously reacting both compounds.

As the Lewis base, mention may be made of acetylaccetone, tetrahydrofuran, pyridine, N,N-dimethylformamide, thiophene, diphenyl ether, triethylamine, an organophosphorus compound, and a monovalent or bivalent alcohol.

The rare earth element containing compounds or reaction products thereof with Lewis base as the component (a) may be used alone or in admixture of two or more compounds and products.

The aluminoxane (b) used in the catalyst according to the invention is a compound represented by the following general formula (I) or (II):

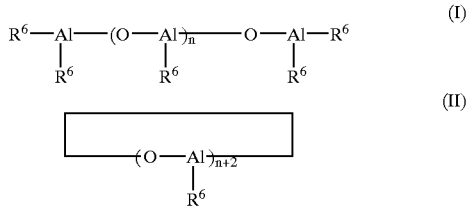

(wherein $R^6$s are the same or different and are a hydrocarbon group having a carbon number of 1–20, and n is an integer of not less than 2). And also, it may be an association body of aluminoxanes described Fine Chemical, 23, (9), 5 (1994), J. Am. Chem. Soc., 115, 4971 (1993) and J. Am. Chem. Soc., 117, 6465 (1995).

In the aluminoxane of the formula (I) or (II), the hydrocarbon group represented by $R^6$ includes methyl group, ethyl group, propyl group, butyl group, isobutyl group, t-butyl group, hexyl group, isohexyl group, octyl group, isooctyl group and so on. Among them, methyl, ethyl, isobutyl and t-butyl groups are favorable, and particularly methyl group is favorable. And also, n is 2 or more, preferably an integer of 4–100.

As a concrete example of the aluminoxane (b), mention may be made of methylaluminoxane, ethylaluminoxane, n-propylaluminoxane, n-butylaluminoxane, isobutylaluminoxane, t-butylaluminoxane, hexylaluminoxane, isoheyxlaluminoxane and so on.

The aluminoxane (b) may be produced by any one of the conventionally known methods. For example, it can be produced by adding trialkylaluminum or dialkylaluminum monochloride to an organic solvent such as benzene, toluene, xylene or the like and then adding and reacting with water, steam, steam-containing nitrogen gas or a salt having water of crystallization such as copper sulfate pentahydrate, aluminum sulfate hexadecahydrate or the like.

The aluminoxanes (b) may be used alone or in an admixture of two or more compounds.

Another component (b) used in the catalyst according to the invention is an organoaluminum compound represented by a general formula of $AlR^1R^2R^3$ (wherein $R^1$ and $R^2$ are the same or different and are a hydrogen atom and a hydrocarbon group having a carbon number of 1–10, and $R^3$ is a hydrocarbon group having a carbon number of 1–10, provided that $R^3$ is the same or different from $R^1$ and $R^2$). As the organoaluminum compound, mention may be made of trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, hydrogenated diethylaluminum, hydrogenated di-n-propylaluminum, hydrogenated di-n-butylaluminum, hydrogenated diisobutylaluminum, hydrogenated dihexylaluminum, hydrogenated diisohexylaluminum, hydrogenated dioctylaluminum, hydrogenated diisooctylaluminum, ethylaluminum dihydride, n-propylaluminum dihydride, isobutylaluminum dihydride and so on. Among them, triethylaluminum, triisobutylaluminum, hydrogenated diethylaluminum and hydrogenated diisobutylaluminum are favorable.

The organoaluminum compounds as the component (b) may be used alone or in admixture of two or more compounds.

The component (c) used in the catalyst according to the invention is a halogen-containing metal compound, which favorably includes a reaction product between a metal halide and a Lewis base, diethylaluminum chloride, silicon tetrachloride, trimethyl chlorosilane, methyl dichlorosilane, dimethyl dichlorosilane, methyl trichlorosilane, ethylaluminum dichloride, ethylaluminum sesquichloride, tin tetrachloride, tin trichloride, phosphorus trichloride, benzoyl chloride, t-butylchloride and so on. Among them, the reaction product between the metal halide and the Lewis base is preferable.

As the metal halide, mention may be made of beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper bromide, copper iodide, silver chloride, silver bromide, silver iodide, gold chloride, gold bromide, gold iodide and so on. Among them, magnesium chloride, calcium chloride, barium chloride, manganese chloride, zinc chloride and copper chloride are favorable, and particularly magnesium chloride, manganese chloride, zinc chloride and copper chloride are favorable.

As the Lewis base used for producing the reaction product with the above metal halide, phosphorus compounds, carbonyl compounds, nitrogen compounds, ether compounds, alcohols and the like are favorable. Concretely, it includes tributyl phosphate, tri-2-ethylhexyl phosphate, triphenyl phosphate, tricresyl phosphate, triethyl phosphine, tributyl phosphine, triphenyl phosphine, diethyl phosphinoethane, diphenyl phosphinoethane, acetylacetone, benzoyl-acetone, propiontrileacetone, valerylacetone, ethylacetylacetone, methyl acetoacetate, ethylacetoacetate, phenyl acetoacetate, dimethyl malonate, diethyl malonate, diphenyl malonate, acetic acid, octanoic acid, 2-ethyl-hexanoic acid, oleic acid, stearic acid, benzoic acid, napthenic acid, versatic acid (carboxylic acid wherein carboxyl group is bonded to a tertiary carbon atom, trade name made by Shell Chemical Corporation), triethylamine, N,N-dimethyl acetoamide, tetrahydrofuran, diphenyl ether, 2-ethyl-hexylalcohol, oleyl alcohol, stearyl alcohol, phenol, benzyl alcohol, 1-decanol, lauryl alcohol and so on. Among them, tri-2-ethylhexyl phosphate, tricresyl phosphate, acetylacetone, 2-ethylhexanoic acid, versatic acid, 2-ethylhexyl alcohol, 1-decanol and lauryl alcohol are favorable.

The above Lewis base is reacted in an amount of 0.01–30 moles, preferably 0.5–10 moles per 1 mole of the metal halide. When using the reaction product between the metal halide and the Lewis base, metal remaining in the polymer can be decreased.

The amount and composition ratio of the components used in the invention are set to various different values in accordance with the use purpose and necessity.

The amount of the component (a) is 0.00001–1.0 mmol per 100 g of the conjugated diene compound. When the amount is less than 0.00001 mmol, the polymerization activity undesirably lowers, while when it exceeds 1.0 mmol, the catalyst concentration becomes undesirably high and the step of removing ash is required. Preferably, the component (a) is used in an amount of 0.0001–0.5 mmol.

And also, the amount of the component (b) used can be represented by a molar ratio of Al to the component (a). The molar ratio of component (a) to component (b) is 1:1–1:500, preferably 1:3–1:250, more particularly 1:5–1:200.

Moreover, a ratio of component (a) to component (c) is 1:0.1–1:30, preferably 1:0.2–1:15 as a molar ratio.

When the amount or composition ratio is outside the above range, the resulting catalyst does not act as a high activity catalyst and a step of removing a catalyst residue is undesirably required. On the other hand, a hydrogen gas for adjusting the molecular weight of the polymer can be used together with the catalyst consisting of the components (a), (b) and (c) to conduct polymerization reaction.

In addition to the above components (a), (b) and (c), a conjugated diene monomer and/or a non-conjugated diene compound may be used in an amount of 0–1,000 mol per 1 mol of the component (a), if necessary. As the conjugated diene compound used in the production of the catalyst, use may be made of the same monomer as used in the polymerization such as 1,3-butadiene, isoprene and the like. As the non-conjugated diene compound, mention may be made of divinylbenzene, diisopropenyl benzene, triisopropenyl benzene, 1,4-vinylhexadiene, ethylidene norbornene and the like. The conjugated diene compound as a catalyst component is not essential, but provides a merit of more improving the catalyst activity when it is used together with the components (a)–(c).

The catalyst according to the invention may be prepared by reacting the components (a)–(c) dissolved in a solvent or further with the conjugated diene compound and/or non-conjugated diene compound, if necessary. In this case, the addition order of these components is optional. It is favorable that these components are previously mixed and reacted and then maturated from a viewpoint of the improvement of polymerization activity and the shortening of polymerization induction period. The maturating temperature is 0–100° C., preferably 20–80° C. When the temperature is lower than 0° C., the sufficient maturation is not conducted, while when it exceeds 100° C., the catalyst activity lowers and the broadening of molecular weight distribution is undesirably caused. The maturating time is not particularly restricted, but is usually not less than 0.5 minute. The maturation may be conducted by contacting the components with each other in a line before the addition to a polymerization reaction vessel and is stable over several days.

In the invention, the conjugated diene compound is polymerized by using the catalyst consisting essentially of the above components (a)–(c).

As the conjugated diene compound polymerizable with the catalyst according to the invention, mention may be made of 1,3-butadiene, 2-methyl-1,3-butadiene (isoprene), 2,3-dimethyl-1,3-butadiene, 1,3-pentadiene, 1,3-hexadiene, myrcene, cyclo-1,3-pentadiene and so on. Particularly, 1,3-butadiene, isoprene and 1,3-pentadiene are favorable These conjugated compounds may be used alone or in admixture of two or more compounds. When two or more compounds are used, a copolymer is obtained.

The polymerization of the conjugated diene compound according to the invention can be carried out by using a solvent or in the absence of the solvent.

The polymerization solvent is an inert organic solvent, which includes, for example, a saturated aliphatic hydrocarbon having a carbon number of 4–10 such as butane, pentane, hexane, heptane or the like; a saturated alicyclic hydrocarbon having a carbon number of 5–20 such as cyclopentane, cyclohexane or the like; mono-olefin such as 1-butene, 2-butene or the like; an aromatic hydrocarbon such as benzene, toluene, xylene or the like; and a halogenated hydrocarbon such as methylene chloride, chloroform, carbon tetrachloride, trichloroethylene, perchloroethylene, 1,2-dichloroethane, chlorobenzene, bromobenzene, chlorotoluene and the like.

These polymerization solvents may be used alone or in admixture of two or more solvents.

The polymerization temperature is usually −30° C.–200° C., preferably 0–150° C. The polymerization reaction may be batch or continuous. Moreover, it is necessary to sufficiently take care that a substance having a deactivation action such as oxygen, water, carbon dioxide or the like is not incorporated into the polymerization system in order to deactivate the catalyst of the rare earth element containing compound and the polymer according to the invention.

Since the specified catalyst is used in the invention, there can be obtained conjugated diene polymers having a high content of cis-1,4-bond and a sharp molecular weight distribution.

Thus, the conjugated diene polymer obtained by using the catalyst consisting essentially of the components (a)–(c) before the modification has a content of cis-1,4-bond of not less than 85%, preferably not less than 90%, a content of 1,2-vinyl bond of not more than 2.0%, preferably not more than 1.8%, and a ratio Mw/Mn of not more than 4.0, preferably not more than 3.5.

When the content of cis-1,4-bond in the conjugated diene polymer obtained according to the invention before the modification is less than 85%, the mechanical properties and wear resistance are poor. And also, when the content of 1,2-vinyl bond exceeds 2.0%, the mechanical properties and wear resistance are poor.

The adjustment of such a microstructure (content of cis-1,4-bond, content of 1,2-vinyl bond) can easily be conducted by controlling the polymerization temperature.

On the other hand, when the ratio Mw/Mn of the conjugated diene polymer before the modification according to the invention exceeds 4.0, the mechanical properties and wear resistance are poor. The adjustment of such a ratio Mw/Mn can easily be conducted by controlling the molar ratio of the components (a)–(c).

Moreover, the conjugated diene polymer before the modification is favorable to have a Moony viscosity (ML1+4, 100° C.) of 10–100. When the Moony viscosity is less than 10, the mechanical properties and wear resistance after the vulcanization are poor, while when it exceeds 100, the processability in the kneading is poor and the mechanical properties are degraded.

According to the invention, after the conjugated diene compound is polymerized by using the catalyst of the rare earth element containing compound, a compound having a specified functional group is subsequently added to an active terminal of the resulting living polymer to react (modify) the active terminal of the polymer with the compound having the specified functional group and increase the molecular weight of the polymer or branch the polymer chain, if necessary, whereby a novel polymer having a good interaction with silica is formed.

By such a modification is improved the interaction with silica to further improve the properties such as wear resistance, mechanical properties, low heat build-up and the like.

In the invention, the component (d) to be reacted with the active terminal of the polymer is a vinyl compound containing a hydroxyl group in its molecule.

As the component (d), mention may be made of hydroxymethyl (metha)acrylate, 2-hydroxyethyl (metha) acrylate, 2-hydroxypropyl (metha)acrylate, 3-hydroxypropyl (metha)acrylate, 3-chloro-2-hydroxypropyl (metha)acrylate, 3-phenoxy-2-hydroxypropyl (metha)acrylate, glycerol mono(metha) acrylate, hydroxybutyl (metha)acrylate, hydroxyhexyl (metha)acrylate, hydroxyoctyl (metha)acrylate, hydroxymethyl (metha)acrylamide, 2-hydroxyethyl (metha) acrylamide, 2-hydroxypropyl (metha)acrylamide, 3-hydroxypropyl (metha)acrylamide, di-(ethylene glycol) itaconate, di-(propylene glycol) itaconate, bis(2-hydroxypropyl) itaconate, bis(2-hydroxyethyl) itaconate, bis (2-hydroxyethyl) fumarate, bis(2-hydroxyethyl) maleate and so on.

The components (d) may be used alone or in admixture of two or more compounds.

The component (e) to be reacted with the active terminal of the polymer is an epoxy compound, which includes, for example, styrene oxide, epoxidized soybean oil, glycidyl (metha)acrylate, allylglycidyl ether, vinylglycidyl ether, ethylene oxide, propylene oxide, 1,2-epoxybutane, 1,2-epoxy-i-butane, 2,3-epoxybutane, 1,2-epoxyhexane, 1,2-epoxyoctane, 1,2-epoxydecane, 1,2-epoxytetradecane, 1,2-epoxyhexadecane, 1,2-epoxyoctadecane, 1,2-epoxyeicosane, 1,2-epoxy-2-pentylpropane, 3,4-epoxy-1-butene, 1,2-epoxy-5-hexene, 1,2-epoxy-9-decene, 1,2-epoxy cyclopentane, 1,2-epoxy cyclohexane, 1,2-epoxy cyclododecane, 1,2-epoxy ethylbenzene, 1,2-epoxy-1-methoxy-2-methylpropane, glycidyl methyl ether, glycidyl ethyl ether, glycidyl isopropyl ether, glycidyl phenyl ether, glycidyl butyl ether, ethylene glycol diglycidyl ether, neopentyl glycol diglycidyl ether, trimethylol propane polyglycidyl ether, glycerol polyglycidyl ether, polypropylene glycol diglycidyl ether, polyethylene glycol diglycidyl ether, sorbitol polyglycidyl ether, N,N-diglycidyl aniline, N,N-diglycidyl toluidine, N,N-diglycidyl-3-glycidyloxyaniline, N,N-diglycidyl-2-glycidyloxyaniline, N,N,N',N'-tetraglycidyl aminodiphenyl methane, trisepoxypropyl isocyanurate, N,N-diglycidyl butylamine, N-glycidyl pyrolidine, N-glycidyl piperidine, N-glycidyl morpholine, N,N'-diglycidyl piperadine, N,N'-diglycidyl homopiperadine, N-glycidyl-N'-methyl piperadine, N-glycidyl-N'-benzyl piperadine, 2-diglycidylaminoethyl-N-methyl pyrrolidine and so on.

The components (e) may be used alone or in admixture of two or more compounds.

Moreover, the compounds of the above components (d)–(e) (hereinafter referred to as a modifying agent) may be used alone or in admixture of two or more compounds.

The amount of the modifying agent used to the component (a) is 0.01–200, preferably 0.1–150 as a molar ratio. When the amount is less than 0.01, the reaction insufficiently proceeds and also the interaction with silica is not sufficiently developed and the effect of improving the wear resistance and low heat build-up is not developed, while when it exceeds 200, the effect of improving the dispersibility of silica and the properties is saturated and insoluble matter in toluene (gel) is undesirably formed according to circumstances.

It is desirable that the modification reaction is carried out at a temperature of not higher than 160° C., preferably −30° C. to +130° C. for 0.1–10 hours, preferably 0.2–5 hours.

After the completion of the modification, an objective polymer can be recovered by adding a short-stop, a polymerization stabilizer or the like to the reaction system, if necessary, and conducting well-known solvent-removing and drying operations in the production of the conjugated diene polymer.

Moreover, the resulting polymer can be recovered by adding a process oil such as aromatic oil, naphthenic oil or the like prior to the solvent removal, if necessary, and then by the solvent-removing and drying operations.

The conjugated diene polymer obtained according to the invention is used in rubber applications requiring mechanical properties and wear resistance such as tread, sidewall and various members in tires for passenger car, truck and bus and tires for winter season such as studless tire or the like, hoses, belts, vibration damping rubber and other industrial articles alone or by blending with the other synthetic rubber or natural rubber and compounding with a process oil, if necessary, and further with a filler such as silica or the like, a vulcanizing agent, a vulcanization accelerator and other additives and thereafter vulcanizing them. And also, it may be blended with emulsion-polymerized SBR, solution-polymerized SBR, polyisoprene, EP(D)M, butyl rubber, hydrogenated BR or hydrogenated SBR other than natural rubber.

The conjugated diene polymer obtained according to the invention is modified with the modifying agent having the specified functional group, so that the dispersibility of silica in the rubber composition is improved by bonding such a functional group to various functional groups existing on the surface of silica to conduct the interaction between silica and rubber.

The rubber composition according to the invention is formed by using the above conjugated diene polymer according to the invention alone as a starting rubber or blending it with the other synthetic rubber or natural rubber and compounding with a process oil, if necessary, and adding silica as a filler and usual additives such as a vulcanizing agent, a vulcanization accelerator and the like thereto.

In order to well develop the excellent properties of the conjugated diene polymer according to the invention, such a polymer is included in the starting rubber at an amount of not less than 10% by weight, preferably not less than 20% by weight, more particularly not less than 30% by weight.

And also, paraffinic, naphtenic, aromatic oils are mentioned as the process oil used for oil-extending or compounding. The amount used is not more than 80 parts by weight, preferably 20–60 parts by weight per 100 parts by weight of the starting rubber.

As silica used, mention may be made of dry-process white carbon, wet-process white carbon, colloidal silica, precipitated silica and so on. The wet-process white carbon consisting essentially of hydrous silicate is favorable. Silica is favorable to be existent in an acidic zone for further improving the dispersibility. And also, silica treated with a coupling agent or the like may be used.

The specific surface area of silica is not particularly restricted, but is usually 50–400 $m^2/g$, preferably 100–250 $m^2/g$. When the specific surface area is too small, the reinforcing property is poor, while when it is too large, the processability is poor and the improvement of the wear resistance and rebound resilience is insufficient.

The amount of silica used is 10–200 parts by weight, preferably 20–150 parts by weight per 100 parts by weight of the starting rubber. When it is less than 10 parts by weight, the reinforcing property is poor and the effect of improving the wear resistance and low heat build-up is not obtained, while when it exceeds 200 parts by weight, the viscosity of the uncured rubber composition rises and hence the processability, wear resistance and low heat build-up are poor.

Moreover, a silane coupling agent may further be compounded in the rubber composition according to the invention.

As the silane coupling agent, mention may be made of γ-mercaptopropyl trimethoxysilane, γ-aminopropyl triethoxysilane, bis[3-(triethoxysilyl)propyl] tetrasulfide, bis [3-(triethoxysilyl)propyl] disulfide, bis[3-(triethoxysilyl) propyl] trisulfide, tetrasulfides such as bis[3-(triethoxysilyl) propyl] tetrasulfide, γ-trimethoxysilylpropyl dimethylthiocarbamyl tetrasulfide, γ-trimethoxysilylpropyl benzothiazyl tetrasulfide, and so on.

The amount of the silane coupling agent used is 1–20 parts by weight, preferably 1–15 parts by weight per 100 parts by weight of the starting rubber. When the amount is less than 1 part by weight, the reinforcing property with silica is not obtained and the breaking strength, wear resistance and low heat build-up are poor, while when the amount exceeds 20 parts by weight, it is uneconomical and the effect of improving the properties is saturated.

As the vulcanizing agent is usually used sulfur, an amount of which is 0.1–3 parts by weight, preferably 0.5–2 parts by weight per 100 parts by weight of the starting rubber.

As the vulcanization aid and processing aid is generally used stearic acid, an amount of which is 0.5–5 parts by weight per 100 parts by weight of the starting rubber.

The vulcanization accelerator is not particularly restricted, but is preferably a thiazole based vulcanization accelerator such as M (2-mercaptobenzothiazole), DM (dibenzothiazyl disulfide), CZ (N-cyclohexyl-2-benzothiazyl sulfenamide) or the like, an amount of which is 0.1–5 parts by weight, preferably 0.2–3 parts by weight per 100 parts by weight of the starting rubber.

If necessary, the rubber composition according to the invention may be compounded with a filler other than silica such as carbon black, calcium carbonate, titanium oxide or the like, and an additive such as zinc oxide, antioxidant, antiozonant or the like.

The rubber composition according to the invention is obtained by kneading in a kneader such as rolls, internal mixer or the like, and shaped and vulcanized, which can be used to not only tire application such as tread, under-tread, carcass, sidewall, bead portion or the like but also industrial application such as hose, belt, shoe bottom, window frame, sealing member, vibration damping rubber or the like. Particularly, it is favorable to be used as a rubber for the tire tread.

The following examples are given in illustration of the invention and are not intended as limitations thereof.

In these examples, part and % are by weight unless otherwise specified. And also, various measurements in the examples are carried out by the following methods.

Mooney Viscosity ($ML_{1+4}$, 100° C.)

It is measured at a temperature of 100° C. for a measuring time of 4 minutes after the preliminary heating for 1 minute.

Number Average Molecular Weight (Mn). Weight Average Molecular Weight (Mw):

They are measured by using an apparatus of Model "HLC-8120GPC", made by Toso Co., Ltd., and a differential refractometer as a detector under the following conditions.

Column: "Column GMHHXL", made by Toso Co., Ltd.
Mobile phase: tetrahydrofuran

Microstructure (Content of Cis-1,4-bond, Content of 1,2-vinyl Bond):

It is measured by an infrared ray method (Morero's method).

Tensile Strength

It is measured according to a method of JIS K6301.

Tan δ

A value at 50° C. is measured by using a mechanical spectrometer (made by Rheometric Corporation).

Wear Resistance

It is evaluated at room temperature by using a Lambourn type abrasion testing machine (made by Shimada Giken Co., Ltd.) at a slip ratio of 60%.

EXAMPLE 1

Into an autoclave of 5 liters purged with nitrogen are charged 2.4 kg of cyclohexane and 300 g of 1,3-butadiene under a nitrogen atmosphere. A catalyst, which is obtained by previously reacting and maturing a cyclohexane solution of neodymium versatate (hereinafter abbreviated as Nd(ver)$_3$) (0.09 mmol), a toluene solution of methyl aluminoxane (hereinafter abbreviated as MAO)(7.2 mmol), hydrogenated diisobutylaluminum (hereinafter abbreviated as $Al^iBu_2H$) (3.6 mmol) and a toluene solution of diethylaluminum chloride (hereinafter abbreviated as DEAC)(0.18 mmol) as a catalyst component with an amount of 1,3-butadiene corresponding to 5 times an amount of neodymium at 50° C. for 30 minutes, is added to conduct polymerization at 80° C. for 60 minutes. The conversion of 1,3-butadiene is approximately 100%.

Then, the resulting polymer solution is kept at a temperature of 50° C. and added with an epoxidized soybean oil (4.5 mmol) and reacted therewith for 30 minutes. Thereafter, a methanol solution containing 1.5 g of 2,4-di-tert-butyl-p-cresol is added to stop polymerization and the solvent is removed by steam stripping and the resulting reaction product is dried on rolls of 110° C. to obtain a polymer. The polymerization conditions and analytical results are shown in Table 1.

EXAMPLE 2

The same procedure as in Example 1 is repeated except that silicon tetrachloride is used instead of diethylaluminum chloride. The polymerization conditions and analytical results are shown in Table 1.

EXAMPLE 3

The same procedure as in Example 1 is repeated except that a complex of zinc chloride and 1-decanol is used instead of diethylaluminum chloride. The polymerization conditions and analytical results are shown in Table 1.

EXAMPLE 4

The same procedure as in Example 3 is repeated except that styrene oxide is used instead of the epoxidized soybean oil. The polymerization conditions and analytical results are shown in Table 1.

EXAMPLE 5

The same procedure as in Example 3 is repeated except that 2-hydroxyethyl methacrylate (hereinafter abbreviated as HEMA) is used instead of the epoxidized soybean oil. The polymerization conditions and analytical results are shown in Table 1.

EXAMPLE 6

Into an autoclave of 5 liters purged with nitrogen are charged 2.4 kg of cyclohexane and 300 g of 1,3-butadiene under a nitrogen atmosphere. A catalyst, which is obtained by previously reacting and maturing a cyclohexane solution of neodymium versatate (0.37 mmol), a toluene solution of triisobutyl aluminum (hereinafter abbreviated as $Al^iBu_3$) (11.1 mmol), hydrogenated diisobutylaluminum (3.7 mmol) and a toluene solution of diethylaluminum chloride (0.74 mmol) as a catalyst component with an amount of 1,3-butadiene corresponding to 5 times an amount of neodymium at 50° C. for 30 minutes, is added to conduct polymerization at 80° C. for 60 minutes. The conversion of 1,3-butadiene is approximately 100%.

Then, the resulting polymer solution is kept at a temperature of 50° C. and added with an epoxidized soybean oil (4.5 mmol) and reacted therewith for 30 minutes. Thereafter, a methanol solution containing 1.5 g of 2,4-di-tert-butyl-p-cresol is added to stop polymerization and the solvent is removed by steam stripping and the resulting reaction product is dried on rolls of 110° C. to obtain a polymer. The polymerization conditions and analytical results are shown in Table 1.

EXAMPLE 7

The same procedure as in Example 6 is repeated except that styrene oxide is used instead of the epoxidized soybean oil. The polymerization conditions and analytical results are shown in Table 1.

EXAMPLE 8

The same procedure as in Example 6 is repeated except that HEMA is used instead of the epoxidized soybean oil. The polymerization conditions and analytical results are shown in Table 1.

COMPARATIVE EXAMPLE 1

Into an autoclave of 5 liters purged with nitrogen are charged 2.4 kg of cyclohexane and 300 g of 1,3-butadiene under a nitrogen atmosphere. A catalyst, which is obtained by previously reacting and maturing a cyclohexane solution of neodymium versatate (0.09 mmol), a toluene solution of methyl aluminoxane (7.2 mmol), hydrogenated diisobutylaluminum (3.6 mmol) and a toluene solution of diethylaluminum chloride (0.18 mmol) as a catalyst component with an amount of 1,3-butadiene corresponding to 5 times an amount of neodymium at 50° C. for 30 minutes, is added to conduct polymerization at 80° C. for 60 minutes. The conversion of 1,3-butadiene is approximately 100%.

Then, a methanol solution containing 1.5 g of 2,4-di-tert-butyl-p-cresol is added to stop polymerization and the solvent is removed by steam stripping and the resulting reaction product is dried on rolls of 110° C. to obtain a polymer. The polymerization conditions and analytical results are shown in Table 2.

COMPARATIVE EXAMPLE 2

The same procedure as in Comparative Example 1 is repeated except that silicon tetrachloride is used instead of diethylaluminum chloride. The polymerization conditions and analytical results are shown in Table 2.

COMPARATIVE EXAMPLE 3

The same procedure as in Comparative Example 1 is repeated except that a complex of zinc chloride and 1-decanol is used instead of diethylaluminum chloride. The polymerization conditions and analytical results are shown in Table 2.

COMPARATIVE EXAMPLE 4

Into an autoclave of 5 liters purged with nitrogen are charged 2.4 kg of cyclohexane and 300 g of 1,3-butadiene under a nitrogen atmosphere. A catalyst, which is obtained by previously reacting and maturing a cyclohexane solution of neodymium versatate (0.37 mmol), a toluene solution of triisobutyl aluminum (11.1 mmol), hydrogenated diisobutylaluminum (3.6 mmol) and a toluene solution of diethylaluminum chloride (0.74 mmol) as a catalyst component with an amount of 1,3-butadiene corresponding to 5 times an amount of neodymium at 50° C. for 30 minutes, is added to conduct polymerization at 80° C. for 60 minutes. The conversion of 1,3-butadiene is approximately 100%.

Then, a methanol solution containing 1.5 g of 2,4-di-tert-butyl-p-cresol is added to stop polymerization and the solvent is removed by steam stripping and the resulting reaction product is dried on rolls of 110° C. to obtain a polymer. The polymerization conditions and analytical results are shown in Table 2.

COMPARATIVE EXAMPLE 5

The same procedure as in Example 1 is repeated except that diethylaluminum chloride is not used. The polymerization conditions and analytical results are shown in Table 2.

COMPARATIVE EXAMPLE 6

The same procedure as in Example 6 is repeated except that diethylaluminum chloride is not used. However, the measurement of Mooney viscosity and evaluation on the properties of vulcanizate can not be carried out because the yield of the polymer is only 12 g. The polymerization conditions and analytical results are shown in Table 2.

COMPARATIVE EXAMPLE 7

The properties of a commercially available polybutadiene rubber (BR01, trade name, made by JSR Corporation) are shown in Table 2.

Then, the evaluation of the properties is carried out by using the polymers of Examples 1–8 and Comparative Examples 1–7. A rubber composition containing silica is prepared by the following method. At first, the kneading is carried out according to the following compounding recipe A in a plastomill at a kneading start temperature of 110° C. for 3.5 minutes. The resulting kneaded mass is again kneaded in a plastomill. In the rekneading, the kneading start temperature is 110° C. and the kneading time is 2 minutes.

| Compounding Recipe A | (part) |
| --- | --- |
| polymer | 100 |
| silica (*1) | 50 |
| aromatic oil | 10 |
| stearic acid | 2 |
| antioxidant (*2) | 1 |

(*1): VN3, trade name, made by Nippon Silica Co., Ltd.
(*2): N-isopropyl-N'-phenyl-p-phenylene Then, the kneaded mass is added with chemicals according to the following compounding recipe B and kneaded in a plastomill at a kneading start temperature of 80° C. for 1 minute. The resulting rubber composition is vulcanized under pressure at 160° C. for an optimum time to obtain a specimen of a vulcanizate. The properties of the thus vulcanized rubber are shown in Tables 1 and 2.

| Compounding recipe B | (part) |
| --- | --- |
| zinc white | 2.5 |
| vulcanization accelerator(*1) | 0.8 |
| vulcanization accelerator(*2) | 1 |
| vulcanization accelerator(*3) | 1 |
| sulfur | 1.3 |

(*1)diphenyl guanidine
(*2)dibenzothiazol disulfide
(*3)N-t-butyl-2-benzothiazyl sulfenamide

TABLE 1

| | Rare earth element compound (mmol) | Aluminoxane or organoaluminum compound (mmol) | | Halogen-containing compound (mmol) | Modifying agent (mmol) | Polymerization results | | |
|---|---|---|---|---|---|---|---|---|
| | | | | | | Polymerization temperature (°C.) | Polymerization time (h) | Yield of polymer (g) |
| Example 1 | Nd(ver)$_3$ (0.09) | MAO (7.2) | Al$^i$Bu$_2$H (3.6) | DEAC (0.18) | epoxidized soybean oil (4.5) | 80 | 1 | 290 |
| Example 2 | Nd(ver)$_3$ (0.09) | MAO (7.2) | Al$^i$Bu$_2$H (3.6) | SiCl$_4$ (0.05) | epoxidized soybean oil (4.5) | 80 | 1 | 290 |
| Example 3 | Nd(ver)$_3$ (0.09) | MAO (7.2) | Al$^i$Bu$_2$H (3.6) | ZnCl$_2$/1-decanol (0.09) | epoxidized soybean oil (4.5) | 80 | 1 | 290 |
| Example 4 | Nd(ver)$_3$ (0.09) | MAO (7.2) | Al$^i$Bu$_2$H (3.6) | ZnCl$_2$/1-decanol (0.09) | styrene oxide (4.5) | 80 | 1 | 290 |
| Example 5 | Nd(ver)$_3$ (0.09) | MAO (7.2) | Al$^i$Bu$_2$H (3.6) | ZnCl$_2$/1-decanol (0.09) | HEMA (4.5) | 80 | 1 | 280 |
| Example 6 | Nd(ver)$_3$ (0.37) | Al$^i$Bu$_3$ (11.1) | Al$^i$Bu$_2$H (3.7) | DEAC (0.74) | epoxidized soybean oil (4.5) | 80 | 1 | 280 |
| Example 7 | Nd(ver)$_3$ (0.37) | Al$^i$Bu$_3$ (11.1) | Al$^i$Bu$_2$H (3.7) | DEAC (0.74) | styrene oxide (4.5) | 80 | 1 | 280 |
| Example 8 | Nd(ver)$_3$ (0.37) | Al$^i$Bu$_3$ (11.1) | Al$^i$Bu$_2$H (3.7) | DEAC (0.74) | HEMA (4.5) | 80 | 1 | 280 |

| | Polymerization results | | | | Properties of vulcanizate | | | |
|---|---|---|---|---|---|---|---|---|
| | Mooney viscosity | Mw/Mn (*1) | Content of 1,4-cis bond (%) | Content of 1,2-vinyl bond (%) | TB (MPa) | EB (%) | tan δ 50° C. (index)*2 | Wear resistance (index)*3 |
| Example 1 | 39 | 3.1 | 96.3 | 1.3 | 15.7 | 580 | 132 | 129 |
| Example 2 | 40 | 3.1 | 96.4 | 1.3 | 15.9 | 575 | 134 | 131 |
| Example 3 | 42 | 2.5 | 97.4 | 0.9 | 16.7 | 580 | 137 | 134 |
| Example 4 | 29 | 2.2 | 97.5 | 0.9 | 16.0 | 575 | 126 | 123 |
| Example 5 | 28 | 2.2 | 97.6 | 0.9 | 15.8 | 580 | 127 | 122 |
| Example 6 | 31 | 2.5 | 96.6 | 1.3 | 15.7 | 580 | 131 | 123 |
| Example 7 | 31 | 2.5 | 96.6 | 1.3 | 15.7 | 580 | 124 | 120 |
| Example 8 | 35 | 2.8 | 96.6 | 1.2 | 15.6 | 570 | 123 | 120 |

TABLE 2

| | Rare earth element compound (mmol) | Aluminoxane or organoaluminum compound (mmol) | | Halogen-containing compound (mmol) | Modifying agent (mmol) | Polymerization results | | |
|---|---|---|---|---|---|---|---|---|
| | | | | | | Polymerization temperature (°C.) | Polymerization time (h) | Yield of polymer (g) |
| Comparative Example 1 | Nd(ver)$_3$ (0.09) | MAO (7.2) | Al$^i$Bu$_2$H (3.6) | DEAC (0.18) | — | 80 | 1 | 285 |
| Comparative Example 2 | Nd(ver)$_3$ (0.09) | MAO (7.2) | Al$^i$Bu$_2$H (3.6) | SiCl$_4$ (0.05) | — | 80 | 1 | 290 |
| Comparative Example 3 | Nd(ver)$_3$ (0.09) | MAO (7.2) | Al$^i$Bu$_2$H (3.6) | ZnCl$_2$/1-decanol (0.09) | — | 80 | 1 | 209 |
| Comparative Example 4 | Nd(ver)$_3$ (0.37) | Al$^i$Bu$_3$ (11.1) | Al$^i$Bu$_2$H (3.7) | DEAC (0.74) | — | 80 | 1 | 290 |

TABLE 2-continued

| | | | | | | | | |
|---|---|---|---|---|---|---|---|---|
| Comparative Example 5 | Nd(ver)₃ (0.09) | MAO (7.2) | Al$^i$Bu₂H (3.6) | — | epoxidized soybean oil (4.5) | 80 | 1 | 170 |
| Comparative Example 6 | Nd(ver)₃ (0.37) | Al$^i$Bu₃ (11.1) | Al$^i$Bu₂H (3.7) | — | epoxidized soybean oil (4.5) | 80 | 1 | 13 |
| Comparative Example 7 *4 | — | — | — | — | — | — | — | — |

| | Polymerization results | | | | Properties of vulcanizate | | | |
|---|---|---|---|---|---|---|---|---|
| | | | Content of 1,4-cis bond (%) | Content of 1,2-vinyl bond (%) | | | | |
| | Mooney viscosity | Mw/Mn (*1) | | | TB (MPa) | EB (%) | tan δ 50° C. (index)*2 | Wear resistance (index)*3 |
| Comparative Example 1 | 29 | 2.7 | 96.3 | 1.3 | 14.8 | 590 | 118 | 110 |
| Comparative Example 2 | 28 | 2.5 | 96.4 | 1.3 | 14.7 | 580 | 119 | 112 |
| Comparative Example 3 | 28 | 2.1 | 97.6 | 0.9 | 14.5 | 580 | 121 | 116 |
| Comparative Example 4 | 33 | 2.3 | 96.5 | 1.2 | 14.6 | 575 | 115 | 111 |
| Comparative Example 5 | 45 | 4.8 | 82.4 | 2.4 | 11.7 | 400 | 65 | 77 |
| Comparative Example 6 | — | — | — | — | — | — | — | — |
| Comparative Example 7 | 45 | 4.0 | 95.0 | 2.5 | 13.2 | 550 | 100 | 100 |

(*1)ratio of weight average molecular weight (Mw) to number average molecular weight (Mn)
*2:index value on the basis that Comparative Example 7 is 100, wherein the larger the index value, the better the property
*3:index value on the basis that Comparative Example 7 is 100, wherein the larger the index value, the better the property
*4 commercially available BR (JSR BR01), made by JSR Corporation As seen from Tables 1 and 2, Examples 1–5 improve the breaking strength, low heat build-up and wear resistance after the vulcanization as compared with Comparative Examples 1–3. That is, when hydroxyl group and epoxy group are introduced into the polymer, the reinforcing property with silica is improved and the properties of the vulcanizate are largely improved.

Similarly, Examples 6–8 improve the breaking strength, low heat build-up and wear resistance after the vulcanization as compared with Comparative Example 4. That is, when the above functional groups are introduced into the polymer irrespectively of the catalyst composition, the properties of the vulcanizate are largely improved.

It is understood from Comparative Example 5 that when the content of cis-1,4 bond is low and the content of 1,2-vinyl bond is high, the breaking strength, low heat build-up and wear resistance are considerably poor as compared with Examples 1–3.

EXAMPLES 9–17, COMPARATIVE EXAMPLES 8–16

The polymer of each of Examples 5–7 and Comparative Examples 3 and 7 is blended with natural rubber or solution-polymerized SBR, which is vulcanized by the following compounding method to obtain a vulcanizate. At first, the kneading is carried out according to the following compounding recipe A in a plastomill at a kneading start temperature of 110° C. for 3.5 minutes. The thus kneaded mass is again kneaded in a plastomill. In the rekneading, the kneading start temperature is 110° C. and the kneading time is 2 minutes.

| Compounding recipe A | (part) |
|---|---|
| polymer (*1) | 100 |
| silica (*2) | 50 |
| aromatic oil | 10 |
| stearic acid | 2 |
| antioxidant (*3) | 1 |

(*1) blending ratio is shown in Table 3
(*2) VN3, trade name, made by Nippon Silica Co., Ltd.
(*3) N-isopropyl-N'-phenyl-p-phenylene diamine Then, the thus obtained mass is added with chemicals of the following compounding recipe B and kneaded in a plastomill at a kneading start temperature of 80° C. for 1 minute. The thus obtained rubber composition is vulcanized under pressure at 160° C. for an optimum time to obtain a specimen of a vulcanizate. The properties of the thus vulcanized rubber are shown in Table 3.

| Compounding recipe B | (part) |
|---|---|
| zinc white | 2.5 |
| vulcanization accelerator(*1) | 0.8 |
| vulcanization accelerator(*2) | 1 |
| vulcanization accelerator(*3) | 1 |
| sulfur | 1.3 |

(*1)diphenyl guanidine
(*2)dibenzothiazol disulfide
(*3)N-t-butyl-2-benzothiazyl sulfenamide TABLE 3(a)

|  | Example 9 | Example 10 | Comparative Example 8 | Example 11 | Example 12 | Comparative Example 9 | Example 13 | Example 14 | Comparative Example 10 |
|---|---|---|---|---|---|---|---|---|---|
| Kind of polymer (part) | | | | | | | | | |
| Example 5 | 50 | 10 | 5 | — | — | — | — | — | — |
| Example 6 | — | — | — | 50 | 10 | 5 | — | — | — |
| Example 7 | — | — | — | — | — | — | 50 | 10 | 5 |
| Comparative Example 3 | — | — | — | — | — | — | — | — | — |
| Comparative Example 7 (*1) | — | — | — | — | — | — | — | — | — |
| SBR (*2) | — | — | — | — | — | — | — | — | — |
| natural rubber | 50 | 90 | 95 | 50 | 90 | 95 | 50 | 90 | 95 |
| Properties of vulcanizate | | | | | | | | | |
| Tensile properties M 300% (MPa) | 13.8 | 14.4 | 15.7 | 13.7 | 14.3 | 15.6 | 13.7 | 14.3 | 15.4 |
| TB (MPa) | 26.3 | 26.5 | 27.3 | 25.3 | 26.1 | 27.2 | 24.9 | 25.8 | 27.0 |
| EB (%) | 450 | 480 | 500 | 445 | 475 | 505 | 450 | 475 | 495 |
| Lamborn abrasion test Index (*3) | 115 | 104 | 96 | 123 | 109 | 96 | 116 | 104 | 94 |
| Tan δ (50° C.) Index (*4) | 111 | 106 | 95 | 119 | 107 | 96 | 110 | 105 | 93 |

TABLE 3(b)

|  | Comparative Example 11 | Comparative Example 12 | Comparative Example 13 | Comparative Example 14 | Example 15 | Example 16 | Example 17 | Comparative Example 15 | Comparative Example 16 |
|---|---|---|---|---|---|---|---|---|---|
| Kind of polymer (part) | | | | | | | | | |
| Example 5 | — | — | — | — | 50 | — | — | — | — |
| Example 6 | — | — | — | — | — | 50 | — | — | — |
| Example 7 | — | — | — | — | — | — | 50 | — | — |
| Comparative Example 3 | 50 | 10 | 5 | — | — | — | — | 50 | — |
| Comparative Example 7 (*1) | — | — | — | 50 | — | — | — | — | 50 |
| SBR (*2) | — | — | — | — | 50 | 50 | 50 | 50 | 50 |
| natural rubber | 50 | 90 | 95 | 50 | — | — | — | — | — |
| Properties of vulcanizate | | | | | | | | | |
| Tensile properties M 300% (MPa) | 13.1 | 14.2 | 15.5 | 12.6 | 12.9 | 12.4 | 12.5 | 11.7 | 11.3 |
| TB (MPa) | 23.1 | 25.3 | 27.2 | 22.5 | 24.1 | 23.5 | 22.9 | 21.5 | 20.5 |
| EB (%) | 470 | 480 | 500 | 460 | 390 | 395 | 390 | 400 | 400 |
| Lamborn abrasion test Index (*3) | 104 | 94 | 78 | 100 | 110 | 118 | 109 | 97 | 94 |
| Tan δ (50° C.) Index (*4) | 105 | 93 | 81 | 100 | 109 | 116 | 110 | 97 | 91 |

(*1) commercially available BR (JSR BR01), made by JSR Corporation
(*2) styrene-butadiene rubber having a bound styrene content of 35% and a vinyl bond content of 21% and modified with tin tetrachloride
(*3) index value on the basis that Comparative Example 7 is 100, wherein the larger the index value, the better the property
(*4) index value on the basis that Comparative Example 7 is 100, wherein the larger the index value, the better the property As seen from Table 3, Examples 9–14 improve the breaking strength, low heat build-up and wear resistance after the vulcanization as compared with Comparative Examples 11, 12 and 14. This shows that the properties are improved even when the polymer according to the invention is blended with natural rubber. However, when the amount of the polymer according to the invention is too small per 100 parts in total of the rubber ingredient, the effect of improving the properties is not sufficiently obtained as seen from Comparative Examples 8–10 and 13. Similarly, Examples 15–17 improve the breaking strength, low heat build-up and wear resistance after the vulcanization as compared with Comparative Examples 15–16. This shows that the properties are improved even when the polymer according to the invention is blended with the synthetic rubber instead of natural rubber.

EXAMPLES 18–25, COMPARATIVE EXAMPLES 17–20

The polymer of each of Examples 5–7 and Comparative Example 3 is blended with natural rubber, which is vulcanized by the following compounding method to obtain a vulcanizate. At first, the kneading is carried out according to the following compounding recipe A in a plastomill at a kneading start temperature of 110° C. for 3.5 minutes. The thus kneaded mass is again kneaded in a plastomill. In the rekneading, the kneading start temperature is 110° C. and the kneading time is 2 minutes.

| Compounding recipe A | (part) |
|---|---|
| polymer | 50 |
| natural rubber | 50 |
| silica (*1) | 10–130 |
| aromatic oil | 10 |
| stearic acid | 2 |
| antioxidant (*2) | 1 |
| silane coupling agent (*3) | 0 or 5 |

(*1) VN3, trade name, made by Nippon Silica Co., Ltd.
(*2) N-isopropyl-N'-phenyl-p-phenylene diamine
(*3) bis[3-(triethoxysilyl)propyl] tetrasulfide Then, the thus obtained mass is added with chemicals of the following compounding recipe B and kneaded in a plastomill at a kneading start temperature of 80° C. for 1 minute. The thus obtained rubber composition is vulcanized under pressure at 160° C. for an optimum time to obtain a specimen of a vulcanizate. The properties of the thus vulcanized rubber are shown in Table 4.

| Compounding recipe B | (part) |
|---|---|
| zinc white | 2.5 |
| vulcanization accelerator(*1) | 0.8 |
| vulcanization accelerator(*2) | 1 |
| vulcanization accelerator(*3) | 1 |
| sulfur | 1.3 |

(*1) diphenyl guanidine
(*2) dibenzothiazol disulfide
(*3) N-t-butyl-2-benzothiazyl sulfenamide

TABLE 4

| | Example 18 | Example 19 | Example 20 | Comparative Example 17 | Comparative Example 18 | Example 21 |
|---|---|---|---|---|---|---|
| Kind of polymer (part) | | | | | | |
| Example 5 | — | — | — | — | — | 50 |
| Example 6 | 50 | 50 | 50 | 50 | 50 | — |
| Example 7 | — | — | — | — | — | — |
| Comparative Example 3 | — | — | — | — | — | — |
| natural rubber | 50 | 50 | 50 | 50 | 50 | 50 |
| Silica | 100 | 50 | 30 | 130 | 10 | 50 |
| Silane coupling agent | | | | | | |
| SCP (*1) | — | — | — | — | — | — |
| Properties of vulcanizate | | | | | | |
| Tensile properties M 300% (MPa) | 15.1 | 14.0 | 12.6 | 9.4 | 10.1 | 13.7 |
| TB (MPa) | 27.5 | 26.5 | 23.5 | 17.1 | 18.2 | 25.3 |
| EB (%) | 420 | 450 | 460 | 210 | 510 | 445 |
| Lambourn abrasion test Index (*2) | 130 | 126 | 119 | 77 | 84 | 115 |
| Tan δ (50° C.) Index (*3) | 127 | 120 | 117 | 81 | 83 | 114 |

| | Example 22 | Example 23 | Example 24 | Example 25 | Comparative Example 19 | Comparative Example 20 |
|---|---|---|---|---|---|---|
| Kind of polymer (part) | | | | | | |
| Example 5 | — | 50 | — | — | — | — |
| Example 6 | — | — | 50 | — | — | — |
| Example 7 | 50 | — | — | 50 | — | — |
| Comparative Example 3 | — | — | — | — | 50 | 50 |
| natural rubber | 50 | 50 | 50 | 50 | 50 | 50 |
| Silica | 50 | 50 | 50 | 50 | 50 | 50 |
| Silane coupling agent | | | | | | |
| SCP (*1) | — | 5 | 5 | 5 | — | 5 |
| Properties of vulcanizate | | | | | | |
| Tensile properties M 300% (MPa) | 137 | 15.5 | 15.2 | 15.3 | 13.1 | 13.6 |
| TB (MPa) | 25.5 | 29.1 | 27.9 | 28.0 | 23.1 | 25.5 |
| EB (%) | 450 | 410 | 415 | 415 | 470 | 430 |
| Lambourn abrasion test Index (*2) | 116 | 126 | 138 | 124 | 100 | 116 |

TABLE 4-continued

| Tan δ (50° C.) Index (*3) | 113 | 125 | 137 | 124 | 100 | 115 |
|---|---|---|---|---|---|---|

(*1) bis[3-(triethoxysilyl)propyl] tetrasulfide
(*2) index value on the basis that Comparative Example 7 is 100, wherein the larger the index value, the better the property
(*3) index value on the basis that Comparative Example 7 is 100, wherein the larger the index value, the better the property As seen from Table 4, Examples 18–25 improve the breaking strength, low heat build-up and wear resistance after the vulcanization as compared with Comparative Examples 17–20. And also, it can be seen from Comparative Examples 17–18 that when the amount of silica added in the compounding is too small or too large, the effect of improving the properties is not sufficiently obtained. Furthermore, as seen from Examples 19, 21 and 22 and Comparative Examples 19–20, the rubber compositions containing the polymer according to the invention have the properties after the vulcanization equal to or more than those of the rubber composition containing the unmodified polymer and the silane coupling agent and provide the satisfactory properties even when the silane coupling agent is not added. Moreover, as seen from Examples 23–25, the properties after the vulcanization are further improved by adding the silane coupling agent to the rubber composition containing the polymer according to the invention during the compounding.

The conjugated diene polymers according to the invention are high in the content of cis-1,4-bond and low in the content of 1,2-vinyl bond and narrow in the molecular weight distribution and have the specified functional group interacting with silica in their molecules. Therefore, the conjugated diene polymer according to the invention is excellent in the dispersibility of silica and provides a rubber composition having excellent wear resistance and mechanical strength and a low heat build-up.

What is claimed is:

1. A rubber composition comprising 10–200 parts by weight of silica based on 100 parts by weight of a rubber ingredient consisting of 10–100% by weight of a conjugated diene polymer having a content of cis-1,4-bond of not less than 85%, a content of 1,2-vinyl bond of not more than 2.0% and ratio of weight average molecular weight (Mw) to number average molecular weight (Mn) of not more than 5, wherein the conjugated diene polymer contains at least one functional group selected from the group consisting of an epoxy group and a hydroxyl group in its molecule and 90–0% by weight of another diene polymer or natural rubber, wherein said conjugated diene polymer is obtained by polymerizing a conjugated diene compound with a catalyst consisting essentially of the following components (a) to (c) and subsequently reacting with at least one compound selected from the group consisting of the following components (d) and (e):

Component (a): a compound containing a rare earth element belonging to atomic numbers 57–71 in the Periodic Table excepting a halogen-containing compound, or a reaction product between such a compound and a Lewis base;

Component (b): an aluminoxane and an organoaluminum compound having a general formula of $AlR^1R^2R^3$ (wherein $R^1$ and $R^2$ are the same or different and are a hydrogen atom and a hydrocarbon group having a carbon number of 1–10, and $R^3$ is a hydrocarbon group having a carbon number of 1–10, provided that $R^3$ is the same as or different from $R^1$ and $R^2$);

Component (c): a halogen-containing compound;

Component (d): a hydroxyl group-containing vinyl compound;

Component (e): an epoxy compound.

2. A rubber composition according to claim 1, wherein said rare earth element constituting the component (a) is neodymium, praseodymium, cerium, lanthanum and gadolinium.

3. A rubber composition according to claim 1, wherein said compound containing the rear earth element as the component (a) is a carboxylate, an alkoxide, a β-diketone complex, a phosphate or a phosphite.

4. A rubber composition according to claim 1, wherein said aluminoxane as the component (b) is selected from the group consisting of methylaluminoxane, ethylaluminoxane, n-propylaluminoxane, n-butylaluminoxane, isobutylaluminoxane, t-butylaluminoxane, hexylaluminoxane and isoheyxialuminoxane.

5. A rubber composition according to claim 1, wherein said component (a) is used man amount of 0.00001–1.0 mmol per 100 g of the conjugated diene compound.

6. A rubber composition according to claim 1, wherein a molar ratio of said component (a) to said component (b) is 1:1–1:500.

7. A rubber composition according to claim 1, wherein a molar ratio of said component (a) to said component (c) is 1:0.1–1:30.

8. A rubber composition according to claim 1, wherein said conjugated diene compound is selected from the group consisting of 1,3-butadiene, 2-methyl-1,3-butadiene (isoprene), 2,3-dimethyl-1,3-butadiene, 1,3-pentadiene, 1,3-hexadiene, myrcene and cyclo-1,3-pentadiene.

9. A rubber composition according to claim 1, wherein said compound as the component (d) or (e) is used in a molar ratio to said component (a) of 0.01–200.

10. A rubber composition according to claim 1, further comprising 1–20 parts by weight of a silane coupling agent based on 100 parts by weight of the rubber ingredient.

* * * * *